(12) United States Patent
Shi et al.

(10) Patent No.: US 11,407,035 B2
(45) Date of Patent: Aug. 9, 2022

(54) POWDER SEAL ASSEMBLY FOR DECREASING POWDER USAGE IN A POWDER BED ADDITIVE MANUFACTURING PROCESS

(71) Applicant: General Electric Company, Schenectady, NY (US)

(72) Inventors: Jinjie Shi, Mason, OH (US); Scott Mitchel Lowe, West Chester, OH (US); Matthew Scott Langford, Union, KY (US); Jolene Ranae Grethel, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 689 days.

(21) Appl. No.: 16/262,060

(22) Filed: Jan. 30, 2019

(65) Prior Publication Data

US 2020/0238382 A1 Jul. 30, 2020

(51) Int. Cl.
*B22F 12/00* (2021.01)
*B22F 5/04* (2006.01)
(Continued)

(52) U.S. Cl.
CPC ............... *B22F 12/00* (2021.01); *B22F 5/04* (2013.01); *B22F 7/062* (2013.01); *B23K 26/34* (2013.01);
(Continued)

(58) Field of Classification Search
CPC .. B22F 12/00; B22F 5/04; B22F 7/062; B22F 10/10; B22F 2003/1042; B22F 2007/068;
(Continued)

(56) References Cited

U.S. PATENT DOCUMENTS 2,722,867 A 11/1955 Dackor et al.
5,415,384 A 5/1995 Obrist et al.
(Continued)

FOREIGN PATENT DOCUMENTS

CN 105598450 A 5/2016
CN 107282923 A 10/2017
(Continued)

OTHER PUBLICATIONS

European Search Report Corresponding to Application No. 20151734 dated Apr. 2, 2020.
(Continued)

*Primary Examiner* — Rebecca Janssen
(74) *Attorney, Agent, or Firm* — Dority & Manning, P.A.

(57) ABSTRACT

An additive manufacturing machine for repairing a component includes a build platform that supports the component and a powder dispensing assembly for selectively depositing additive powder over the build platform. A powder seal assembly includes a powder support plate positioned above the build platform and defining an aperture for receiving the component without contacting the component. An inflatable sealing element is operably coupled to the powder support plate around the aperture and is inflated to contact and seal against the component, thereby forming a support surface above the build platform upon which additive powder may be deposited.

20 Claims, 7 Drawing Sheets

(51) Int. Cl.
    *B22F 7/06*     (2006.01)
    *B33Y 10/00*     (2015.01)
    *B33Y 30/00*     (2015.01)
    *B22F 10/10*     (2021.01)
    *B33Y 80/00*     (2015.01)
    *B23K 26/34*     (2014.01)
    *B23K 26/354*     (2014.01)
    *B33Y 50/02*     (2015.01)
    *B22F 3/10*     (2006.01)

(52) U.S. Cl.
    CPC ............ *B23K 26/354* (2015.10); *B33Y 10/00* (2014.12); *B33Y 30/00* (2014.12); *B33Y 50/02* (2014.12); *B33Y 80/00* (2014.12); *B22F 10/10* (2021.01); *B22F 2003/1042* (2013.01); *B22F 2007/068* (2013.01)

(58) Field of Classification Search
    CPC ....... B22F 10/20; B23K 26/34; B23K 26/354; B33Y 10/00; B33Y 30/00; B33Y 50/02; B33Y 80/00; Y02P 10/25; F01D 5/005; F01D 25/285; F05D 2230/22; F05D 2230/31; F05D 2230/234; B23P 6/007; B29C 64/153; B29C 73/24; B29C 64/245
    See application file for complete search history.

(56) References Cited

U.S. PATENT DOCUMENTS

| | | |
|---|---|---|
| 5,702,574 A | 12/1997 | Foster et al. |
| 5,810,344 A | 9/1998 | Nishimoto |
| 5,879,753 A | 3/1999 | Zajchowski et al. |
| 5,913,555 A | 6/1999 | Richter et al. |
| 6,161,826 A | 12/2000 | Forrer |
| 6,401,000 B1 | 6/2002 | Suzuki et al. |
| 6,435,596 B1 | 8/2002 | Phillips |
| 6,449,529 B1 | 9/2002 | Oleksy |
| 6,532,656 B1 | 3/2003 | Wilkins et al. |
| 6,641,128 B2 | 11/2003 | Fries |
| 6,895,350 B2 | 5/2005 | Suzuki et al. |
| 6,908,288 B2 | 6/2005 | Jackson et al. |
| 6,986,654 B2 | 1/2006 | Imiolek et al. |
| 6,993,818 B2 | 2/2006 | Smith et al. |
| 7,009,137 B2 | 3/2006 | Guo |
| 7,034,246 B2 | 4/2006 | Muylaert et al. |
| 7,261,550 B2 | 8/2007 | Herzog |
| 7,357,629 B2 | 4/2008 | Weiskopf et al. |
| 7,449,658 B2 | 11/2008 | Mielke |
| 7,520,495 B2 | 4/2009 | Stark |
| 7,587,818 B2 | 9/2009 | Gorman et al. |
| 7,665,717 B2 | 2/2010 | Lenzini |
| 7,674,107 B2 | 3/2010 | Perret et al. |
| 7,790,096 B2 | 9/2010 | Merot et al. |
| 8,056,606 B2 | 11/2011 | Hasz |
| 8,801,502 B2 | 8/2014 | Ng et al. |
| 8,875,392 B2 | 11/2014 | Richter |
| 8,920,063 B1 | 12/2014 | Easley |
| 8,996,156 B2 | 3/2015 | Melzer-Jokisch et al. |
| 9,073,156 B2 | 7/2015 | Clark et al. |
| 9,216,484 B2 | 12/2015 | Bishop et al. |
| 9,283,593 B2 | 3/2016 | Bruck et al. |
| 9,289,861 B2 | 3/2016 | Czerner |
| 9,302,359 B2 | 4/2016 | Hediger |
| 9,435,211 B2 | 9/2016 | Xu |
| 9,452,474 B2 | 9/2016 | Xu |
| 9,555,522 B2 | 1/2017 | Evans et al. |
| 9,884,393 B2 | 2/2018 | Roberts et al. |
| 9,919,474 B2 | 3/2018 | Napadensky |
| 9,943,933 B2 | 4/2018 | Zu et al. |
| 10,035,223 B2 | 7/2018 | Ladewig et al. |
| 10,086,481 B2 | 10/2018 | Krol et al. |
| 2002/0104973 A1 | 8/2002 | Kerekes |
| 2003/0214571 A1 | 11/2003 | Ishikawa et al. |
| 2004/0191064 A1 | 9/2004 | Guo |
| 2006/0107610 A1 | 5/2006 | Boserio |
| 2007/0003416 A1 | 1/2007 | Bewlay et al. |
| 2007/0077323 A1 | 4/2007 | Stonesmith et al. |
| 2010/0028158 A1 | 2/2010 | Richter |
| 2010/0044944 A1 | 2/2010 | Korn et al. |
| 2012/0076578 A1 | 3/2012 | Schron, Sr. et al. |
| 2012/0085875 A1 | 4/2012 | Hoyt et al. |
| 2014/0023426 A1 | 1/2014 | Schron, Sr. et al. |
| 2014/0163717 A1 | 6/2014 | Das et al. |
| 2014/0259668 A1 | 9/2014 | Henderson et al. |
| 2015/0079306 A1 | 3/2015 | Schoeneborn et al. |
| 2015/0165556 A1 | 6/2015 | Jones et al. |
| 2015/0224607 A1 | 8/2015 | Bruck et al. |
| 2015/0336271 A1 | 11/2015 | Spicer et al. |
| 2016/0023403 A1 | 1/2016 | Ramos et al. |
| 2016/0069184 A1 | 3/2016 | Ribic et al. |
| 2016/0074965 A1 | 3/2016 | Jakimov et al. |
| 2016/0121438 A1 | 5/2016 | Ladewig et al. |
| 2016/0159011 A1 | 6/2016 | Marchione et al. |
| 2016/0167172 A1 | 6/2016 | Goncharov et al. |
| 2016/0250724 A1* | 9/2016 | Krol ........................ B22F 10/20 419/53 |
| 2016/0305777 A1 | 10/2016 | Racine et al. |
| 2016/0318257 A1 | 11/2016 | Brooks et al. |
| 2017/0009584 A1 | 1/2017 | Cui et al. |
| 2017/0056975 A1* | 3/2017 | Carter .................... B33Y 30/00 |
| 2017/0106482 A1 | 4/2017 | Roberts et al. |
| 2017/0120337 A1 | 5/2017 | Kanko et al. |
| 2017/0165922 A1 | 6/2017 | Hakkaku |
| 2017/0259502 A1 | 9/2017 | Chapiro et al. |
| 2018/0038385 A1 | 2/2018 | Welch |
| 2018/0056393 A1 | 3/2018 | Herzog et al. |
| 2018/0079033 A1 | 3/2018 | Krueger et al. |
| 2018/0111319 A1 | 4/2018 | Brezoczky et al. |
| 2018/0200800 A1 | 7/2018 | Hart et al. |
| 2018/0207875 A1 | 7/2018 | Menchik |
| 2018/0236504 A1 | 8/2018 | Pourcher et al. |
| 2018/0236556 A1 | 8/2018 | Garay et al. |
| 2018/0236558 A1 | 8/2018 | Garay et al. |
| 2018/0238172 A1 | 8/2018 | Garay et al. |
| 2018/0238173 A1 | 8/2018 | Garay et al. |
| 2018/0243866 A1 | 8/2018 | Srinivasan et al. |
| 2018/0333813 A1 | 11/2018 | Hornbeck |
| 2018/0345375 A1* | 12/2018 | Van Vaerenbergh .. B33Y 10/00 |
| 2018/0348367 A1 | 12/2018 | Crear et al. |
| 2019/0009472 A1 | 1/2019 | Mark |
| 2019/0015899 A1 | 1/2019 | Chaput et al. |
| 2019/0022760 A1 | 1/2019 | Coskun et al. |
| 2019/0060998 A1 | 2/2019 | Kelkar et al. |
| 2019/0072933 A1 | 3/2019 | Wu et al. |
| 2019/0358755 A1 | 11/2019 | Ott |

FOREIGN PATENT DOCUMENTS

| | | |
|---|---|---|
| DE | 29907262 U1 | 7/1999 |
| DE | 102011102543 A1 | 11/2012 |
| DE | 102010001414 B4 | 5/2013 |
| DE | 102012011217 A1 | 12/2013 |
| DE | 102013213260 A1 | 1/2015 |
| DE | 102017201994 A1 | 8/2018 |
| DE | 102018112248 A1 | 12/2018 |
| EP | 1637274 A1 | 3/2006 |
| EP | 2848335 A1 | 3/2015 |
| EP | 3023177 A1 | 5/2016 |
| EP | 3159080 A1 | 4/2017 |
| EP | 3450058 A1 | 3/2019 |
| FR | 3054799 A1 | 2/2018 |
| GB | 2181374 A | 4/1987 |
| GB | 2453945 | 4/2009 |
| JP | 2009/056511 A | 3/2009 |
| JP | 2010/120104 A | 6/2010 |
| JP | 2016/532586 A | 10/2016 |
| JP | 2017/217674 A | 12/2017 |
| JP | 2018/001723 A | 1/2018 |
| WO | WO2015118180 A1 | 8/2015 |
| WO | WO2016/075802 A1 | 5/2016 |
| WO | WO2017074373 A1 | 5/2017 |

(56) References Cited

FOREIGN PATENT DOCUMENTS

| WO | WO2017/100695 A1 | 6/2017 |
|---|---|---|
| WO | WO2018//145912 A1 | 8/2018 |
| WO | WO2018145912 A1 | 8/2018 |

OTHER PUBLICATIONS

European Search Report Corresponding to Application No. 20151717 dated Jun. 11, 2020.
Praniewicz et al, "Adaptive geometry transformation and repair for hybrid manufacturing", Procedia Manufacturing 26,2018, pp. 228-236.
Praniewicz et al, "An Adaptive Geometry Transformation and Repair Method for Manufacturing", Journal of Manufacturing Science and Engineering, vol. 141, Sep. 2018, pp. 2-8.
Wilson et al, "Remanufacturing of turbine blades by laser direct deposition with its energy and environmental impact analysis", Journal of Cleaner Production 80, 2014, pp. 170-178.
Peng et al., Influence of Energy Density on Energy Demand and Porosity of 316L Stainless Steel Fabricated by Selective Laser Melting, International Journal of Precision Engineering and Manufacturing—Green Technology, vol. 5, No. 1, Jan. 2018, pp. 5562.
Gu et al., Influences of Energy Density on Porosity and Microstructure of Selective Laser Melted 17-4PH Stainless Steel. 24th International SFF Symposium—An Additive Manufacturing Conference, Aug. 16, 2013, pp. 474-489.
Liu et al., Effects of melt-pool geometry on crystal growth and microstructure development in laser surface-melted superalloy single crystals, Mathematical modeling of single-crystal grth in a melt pool (Part 1), Science Direct, Acta Materialia, vol. 52, 2004, pp. 4833-4847.
Mitee-Bite Products, LLC, Workholding Specialists, Aug. 2017 Catalog, 52 Pages.
Jones et al., Remanufacture of turbine blades by laser cladding, machining and in-process scanning in a single machine, Proceedings from $23^{rd}$ Annual International Solid Freeform Fabrication Symposium, Aug. 16, 2012, pp. 821-827.
European Search Report Corresponding to Application No. 20151670 dated Jun. 8, 2020.
European Search Report Corresponding to Application No. 20151679 dated Apr. 2, 2020.
European Search Report Corresponding to Application No. 20151688 dated Mar. 30, 2020.
European Search Report Corresponding to Application No. 20151810 dated May 15, 2020.
European Search Report Corresponding to Application No. 20178188 dated Nov. 3, 2020.
International Search Report Corresponding to Application No. PCT/SG2019/050049 dated Mar. 27, 2019.
Machine Translated Japanese Office Action Corresponding to Application No. 2020010732 dated Jan. 19, 2021.
Machine Translated Japanese Search Report Corresponding to Application No. 2020010713 dated Nov. 18, 2020.
USAF C-5 Galaxy, as shown in ETSY desk model set (Gaga). (Year: 2021)

* cited by examiner

POWDER SEAL ASSEMBLY FOR DECREASING POWDER USAGE IN A POWDER BED ADDITIVE MANUFACTURING PROCESS

FIELD

The present subject matter relates generally to additive manufacturing machines, and more particularly to powder seal assemblies for decreasing powder usage in a powder bed additive manufacturing process.

BACKGROUND

Machine or device components frequently experience damage, wear, and/or degradation throughout their service life. For example, serviced compressor blades of a gas turbine engine show erosion, defects, and/or cracks after long term use. Specifically, for example, such blades are subject to significant stresses which inevitably cause blades to wear over time, particularly near the tip of the blade. For example, blade tips are susceptible to wear or damage from friction or rubbing between the blade tips and shrouds, from chemical degradation or oxidation from hot gasses, from fatigue caused by cyclic loading and unloading, from diffusion creep of crystalline lattices, etc.

Notably, worn or damaged blades may result in machine failure or performance degradation if not corrected. Specifically, such blades may cause a turbomachine to exhibit reduced operating efficiency as gaps between blade tips and turbine shrouds may allow gasses to leak through the turbine stages without being converted to mechanical energy. When efficiency drops below specified levels, the turbomachine is typically removed from service for overhaul and refurbishment. Moreover, weakened blades may result in complete fractures and catastrophic failure of the engine.

As a result, compressor blades for a gas turbine engine are typically the target of frequent inspections, repairs, or replacements. It is frequently very expensive to replace such blades altogether, however, some can be repaired for extended lifetime at relatively low cost (as compared to replacement with entirely new blades). Nevertheless, existing repair processes tend to be labor intensive and time consuming.

For example, a traditional compressor blade tip repair process uses a welding/cladding technique where repair materials are supplied, in either powder or wire form, to the blade tips. The repair materials are melted by focused power source (e.g., laser, e-beam, plasma arc, etc.) and bonded to blade tips. However, blades repaired with such welding/cladding technique need tedious post-processing to achieve the target geometry and surface finish. Specifically, due to the bulky feature size of the welding/cladding repair joint, the repaired blades require heavy machining to remove the extra materials on the tip, and further require a secondary polishing process to achieve a target surface finish. Notably, such a process is performed on a single blade at a time, is very labor intensive and tedious, and results in very large overall labor costs for a single repair.

Alternatively, other direct-energy-deposition (DED) methods may be used for blade repair, e.g., such as cold spray, which directs high-speed metal powders to bombard the target or base component such that the powders deform and deposit on the base component. However, none of these DED methods are suitable for batch processing or for repairing a large number of components in a time efficient manner, thus providing little or no business value.

Accordingly, novel systems and methods have been developed and are presented herein for repairing or rebuilding worn compressor blades (or any other components) using a powder bed additive manufacturing process. Specifically, such a repair process generally includes removing the worn portion of each of a plurality of compressor blades, positioning the plurality of compressor blades on a build platform of an additive manufacturing machine, determining the precise location of each blade tip, and printing repair segments directly onto the blade tips, layer by layer, until the compressor blades reach their original dimensions or another suitable target size and shape.

One of the key challenges with such a novel additive manufacturing DMLM repair procedures described herein relates to loading, unloading, and handling additive powder which is used to fill the powder bed. In this regard, to perform a repair process on the tip of a blade, the powder bed must first be loaded with additive powder to the height of the blade tips. Such a process generally includes manually loading the additive powder, which is time-consuming and can also be costly, especially for components with large dimensions in the build orientation, e.g., the height of the blades. Moreover, any unpacked additive powder might collapse during printing, resulting in failure of recoating. In addition, filling the entire volume of the powder bed which is not filled by components to be repaired can require a large volume of powder which must be added prior to printing, removed after printing, and filtered or screened prior to reuse during a subsequent additive manufacturing process.

Accordingly, a system and method for repairing components using an additive manufacturing machine would be useful. More particularly, an additive manufacturing machine including features for minimizing powder usage during a powder bed additive manufacturing process would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additive manufacturing machine for repairing a component is provided. The additive manufacturing machine includes a build platform configured for supporting the component and being movable along a build direction, a powder dispensing assembly for selectively depositing additive powder over the build platform, and a powder seal assembly. The powder seal assembly includes a powder support plate positioned above the build platform, the powder support plate defining an aperture for receiving the component without contacting the component and an inflatable sealing element operably coupled to the powder support plate around the aperture, the inflatable sealing element being configured for inflating to contact and seal against the component.

In another exemplary aspect of the present disclosure, a method of mounting a component in an additive manufacturing machine is provided. The method includes mounting the component on a build platform, the build platform being movable along a build direction. The method further includes positioning a powder support plate above the build platform, the powder support plate defining an aperture through which the component is received without contacting the powder support plate and inflating an inflatable sealing element positioned around the aperture to contact and seal against the component.

In yet another exemplary aspect of the present disclosure, a powder seal assembly for use in an additive manufacturing machine for repairing a component is provided. The powder seal assembly includes a powder support plate positioned above a build platform of the additive manufacturing machine, the powder support plate defining an aperture for receiving the component without contacting the component and an inflatable sealing element operably coupled to the powder support plate around the aperture, the inflatable sealing element being configured for inflating to contact and seal against the component.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
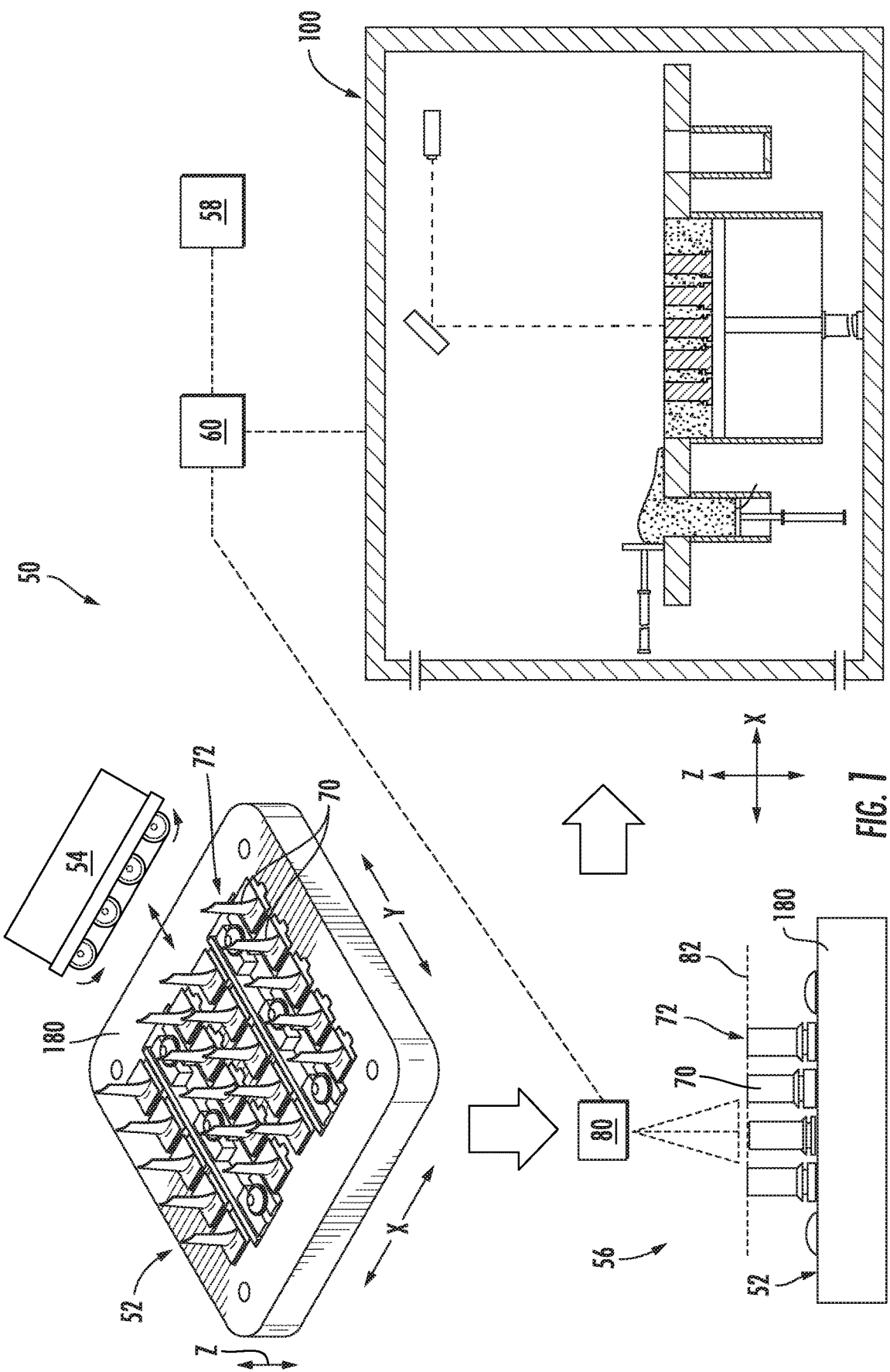
FIG. 1 shows a schematic representation of an additive repair system that may be used for repairing or rebuilding components according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the accompanying drawings. Each example is provided by way of explanation of the invention, not limitation of the invention. In fact, it will be apparent to those skilled in the art that various configurations, modifications, and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to the motion of an object or a flow of fluid. For example, "upstream" refers to the direction from which the object has moved or fluid has flowed, and "downstream" refers to the direction to which the object is moving or the fluid is flowing. Furthermore, as used herein, terms of approximation, such as "approximately," "substantially," or "about," refer to being within a ten percent margin of error.

Aspects of the present subject matter are directed to a system and method for repairing one or more components using an additive manufacturing process. The method includes securing the components in a tooling assembly such that a repair surface of each component is positioned within a single build plane, determining a repair toolpath corresponding to the repair surface of each component using a vision system, depositing a layer of additive powder over the repair surface of each component using a powder dispensing assembly, and selectively irradiating the layer of additive powder along the repair toolpath to fuse the layer of additive powder onto the repair surface of each component.

Specifically, aspects of the present subject matter provide a powder seal assembly including a powder support plate positioned above the build platform and defining an aperture for receiving the component without contacting the component. An inflatable sealing element is operably coupled to the powder support plate around the aperture and is inflated to contact and seal against the component, thereby forming a support surface above the build platform upon which additive powder may be deposited. In this manner, a tip of the component or a plurality of components may be repaired without requiring large amounts of additive powder.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

Referring now to FIG. 1, an exemplary additive repair system 50 will be described according to an exemplary embodiment of the present subject matter. As illustrated, additive repair system 50 generally includes a tooling fixture or assembly 52, a material removal assembly 54, a vision system 56, a user interface panel 58, and an additive manufacturing machine or system 100. Furthermore, a system controller 60 may be operably coupled with some or all parts of additive repair system 50 for facilitating system operation. For example, system controller 60 may be operably coupled to user interface panel 58 to permit operator communication with additive repair system 50, e.g., to input commands, upload printing toolpaths or CAD models, initiating operating cycles, etc. Controller 60 may further be in communication with vision system 56 for receiving imaging data and with AM machine 100 for performing a printing process.

According to exemplary embodiments, tooling assembly 52 is generally configured for supporting a plurality of components in a desired position and orientation. According to exemplary embodiments, tooling assembly 52 supports twenty (20) high pressure compressor blades 70 during an additive manufacturing repair process. Specifically, the additive manufacturing process may be a powder bed fusion process (e.g., a DMLM or DMLS process as described above). Although the repaired components are illustrated herein as compressor blades 70 of a gas turbine engine, it should be appreciated that any other suitable component may be repaired, such as turbine blades, other airfoils, or components from other machines. In order to achieve proper recoating and to facilitate the printing process, it may be desirable to position all blades 70 in the same orientation and at the same height such that a repair surface 72 of each blade is in a single build plane. Tooling assembly 52 is a fixture intended to secure blades 70 in such desired position and orientation.

Material removal assembly 54 may include a machine or device configured for grinding, machining, brushing, etching, polishing, wire electrical discharge machining (EDM), cutting, or otherwise substantively modifying a component, e.g., by subtractive modification or material removal. For example, material removal assembly 54 may include a belt grinder, a disc grinder, or any other grinding or abrasive mechanism. According to an exemplary embodiment, material removal assembly 54 may be configured for removing material from a tip of each blade 70 to obtain a desirable repair surface 72. For example, as explained briefly above, material removal assembly 54 may remove at least a portion of blades 70 that has been worn or damaged, e.g., which may include microcracks, pits, abrasions, defects, foreign material, depositions, imperfections, and the like. According to an exemplary embodiment, each blade 70 is prepared using material removal assembly 54 to achieve the desired repair surface 72, after which the blades 70 are all mounted in tooling assembly 52 and leveled appropriately. However, according to alternative embodiments, material removal assembly 54 may grind each blade 70 as it is fixed in position in tooling assembly 52.

After the blades are prepared, vision system 56 may be used to obtain an image or digital representation of the precise position and coordinates of each blade 70 positioned in tooling assembly 52. In this regard, according to exemplary embodiments, vision system 56 may include any suitable camera or cameras 80, scanners, imaging devices, or other machine vision device that may be operably configured to obtain image data that includes a digital representation of one or more fields of view. Such a digital representation may sometimes be referred to as a digital image or an image; however, it will be appreciated that the present disclosure may be practiced without rendering such a digital representation in human-visible form. Nevertheless, in some embodiments, a human-visible image corresponding to a field of view may be displayed on the user interface 58 based at least in part on such a digital representation of one or more fields of view.

Figure 4:
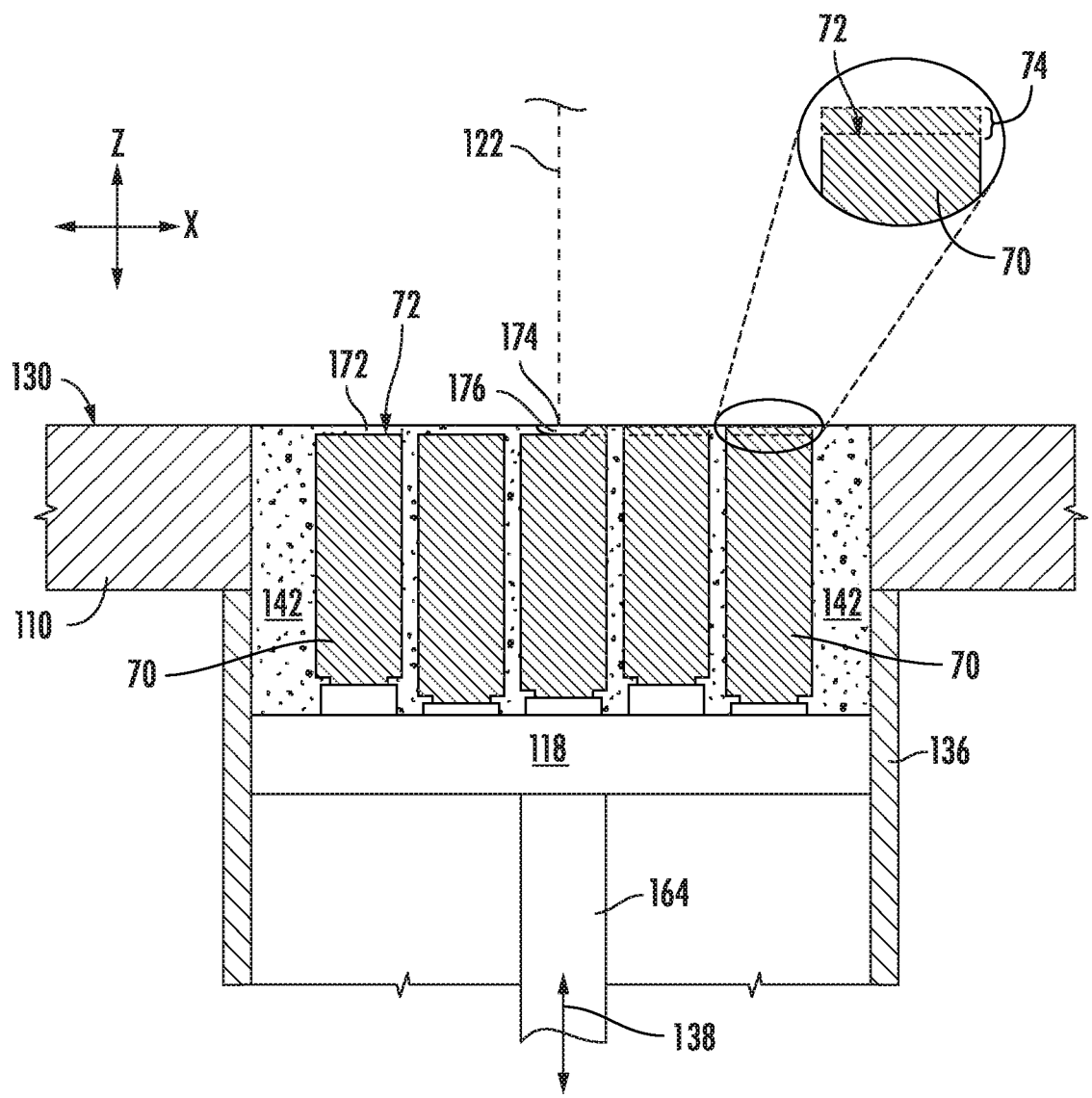
FIG. 4 shows a close-up schematic view of a build platform of the exemplary additive manufacturing machine of FIG. 3 according to an exemplary embodiment of the present subject matter.

Vision system 56 allows the additive repair system 50 to obtain information pertaining to one or more blades 70 onto which one or more repair segments 74 (see FIG. 4) may be respectively additively printed. In particular, the vision system 56 allows the one or more blades 70 to be located and defined so that the additive manufacturing machine 100 may be instructed to print one or more repair segments 74 on a corresponding one or more blades 70 with suitably high accuracy and precision. According to an exemplary embodiment, the one or more blades 70 may be secured to tooling assembly 52, a mounting plate, a build platform, or any other fixture with repair surface 72 of the respective blades 70 aligned to a single build plane 82.

The one or more cameras 80 of the vision system 56 may be configured to obtain two-dimensional or three-dimensional image data, including a two-dimensional digital representation of a field of view and/or a three-dimensional digital representation of a field of view. Alignment of the repair surface 72 of the blades 70 with the build plane 82 allows the one or more cameras 80 to obtain higher quality images. For example, the one or more cameras 80 may have a focal length adjusted or adjustable to the build plane 82. With the repair surface 72 of one or more blades 70 aligned to the build plane 82, the one or more cameras may readily obtain digital images of the repair surface 72.

The one or more cameras 80 may include a field of view that encompasses all or a portion of the one or more blades 70 secured to the tooling assembly 52. For example, a single field of view may be wide enough to encompass a plurality of components, such as each of the plurality of blades 70 secured to tooling assembly 52. Alternatively, a field of view may more narrowly focus on an individual blade 70 such that digital representations of respective blades 70 are obtained separately. It will be appreciated that separately obtained digital images may be stitched together to obtain a digital representation of a plurality of components or blades 70. In some embodiments, the camera 80 may include a collimated lens configured to provide a flat focal plane, such that blades 70 or portions thereof located towards the periphery of the field of view are not distorted. Additionally, or in the alternative, the vision system 56 may utilize a distortion correction algorithm to address any such distortion.

Image data obtained by the vision system 56, including a digital representation of one or more blades 70 may be transmitted to a control system, such as controller 60. Controller 60 may be configured to determine a repair surface 72 of each of a plurality of blades 70 from one or more digital representations of one or more fields of view having been captured by the vision system 56, and then determine one or more coordinates of the repair surface 72 of respective ones of the plurality of blades 70. Based on the one or more digital representations, controller 60 may generate one or more print commands (e.g., corresponding to one or more repair toolpaths, e.g., the path of a laser focal point), which may be transmitted to an additive manufacturing machine 100 such that the additive manufacturing machine 100 may additively print a plurality of repair segments 74 on respective ones of the plurality of blades 70. The one or more print commands may be configured to additively print a plurality of repair segments 74 with each respective one of the plurality of repair segments 74 being located on the repair surface 72 of a corresponding blade 70.

Each of the components and subsystems of additive repair system 50 are described herein in the context of an additive blade repair process. However, it should be appreciated that aspects of the present subject matter may be used to repair or rebuild any suitable components. The present subject matter is not intended to be limited to the specific repair process described. In addition, FIG. 1 illustrates each of the systems as being distinct or separate from each other and implies the process steps should be performed in a particular order, however, it should be appreciated that these subsystems may be integrated into a single machine, process steps may be swapped, and other changes to the build process may be implemented while remaining within the scope of the present subject matter.

For example, vision system 56 and additive manufacturing machine 100 may be provided as a single, integrated unit or as separate stand-alone units. In addition, controller 60 may include one or more control systems. For example, a single controller 60 may be operably configured to control operations of the vision system 56 and the additive manufacturing machine 100, or separate controllers 60 may be operably configured to respectively control the vision system 56 and the additive manufacturing machine 100.

Figure 2:
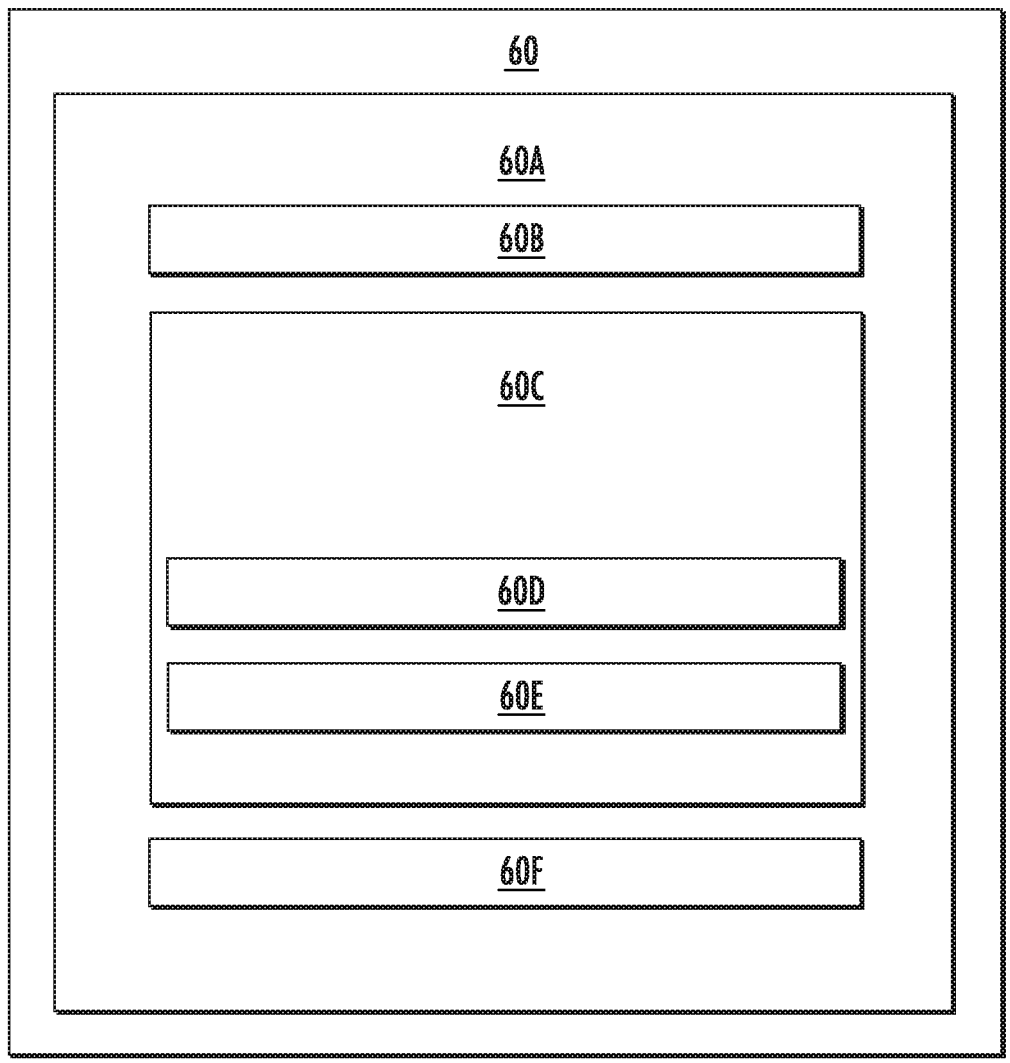
FIG. 2 depicts certain components of a controller according to example embodiments of the present subject matter.

Operation of additive repair system 50, vision system 56, and AM machine 100 may be controlled by electromechanical switches or by a processing device or controller 60 (see, e.g., FIGS. 1 and 2). According to exemplary embodiments, controller 60 may be operatively coupled to user interface panel 58 for user manipulation, e.g., to control the operation of various components of AM machine 100 or system 50. In this regard, controller 60 may operably couple all systems and subsystems within additive repair system 50 to permit communication and data transfer therebetween. In this manner, controller 60 may be generally configured for operating additive repair system 50 or performing one or more of the methods described herein.

FIG. 2 depicts certain components of controller 60 according to example embodiments of the present disclosure. Controller 60 can include one or more computing device(s) 60A which may be used to implement methods as described herein. Computing device(s) 60A can include one or more processor(s) 60B and one or more memory device(s) 60C. The one or more processor(s) 60B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 60C can include one or more non-transitory computer-readable storage medium(s), such as RAM, ROM, EEPROM, EPROM, flash memory devices, magnetic disks, etc., and/or combinations thereof.

The memory device(s) 60C can include one or more computer-readable media and can store information accessible by the one or more processor(s) 60B, including instructions 60D that can be executed by the one or more processor(s) 60B. For instance, the memory device(s) 60C can store instructions 60D for running one or more software applications, displaying a user interface, receiving user input, processing user input, etc. In some implementations, the instructions 60D can be executed by the one or more processor(s) 60B to cause the one or more processor(s) 60B to perform operations, e.g., such as one or more portions of methods described herein. The instructions 60D can be software written in any suitable programming language or can be implemented in hardware. Additionally, and/or alternatively, the instructions 60D can be executed in logically and/or virtually separate threads on processor(s) 60B.

The one or more memory device(s) 60C can also store data 60E that can be retrieved, manipulated, created, or stored by the one or more processor(s) 60B. The data 60E can include, for instance, data to facilitate performance of methods described herein. The data 60E can be stored in one or more database(s). The one or more database(s) can be connected to controller 60 by a high bandwidth LAN or WAN, or can also be connected to controller through one or more network(s) (not shown). The one or more database(s)

can be split up so that they are located in multiple locales. In some implementations, the data 60E can be received from another device.

The computing device(s) 60A can also include a communication module or interface 60F used to communicate with one or more other component(s) of controller 60 or additive manufacturing machine 100 over the network(s). The communication interface 60F can include any suitable components for interfacing with one or more network(s), including for example, transmitters, receivers, ports, controllers, antennas, or other suitable components.

Figure 3:
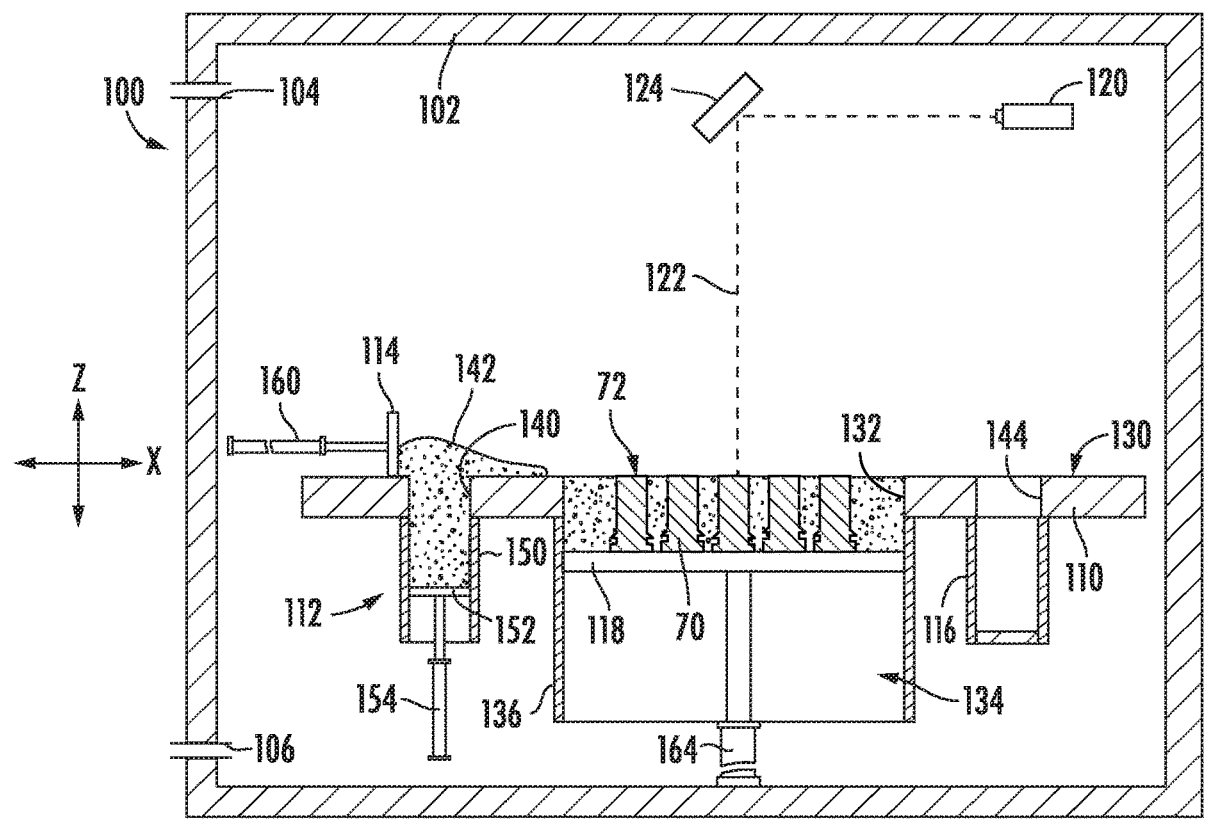
FIG. 3 shows a schematic view of an additive manufacturing machine that may be used as part of the exemplary additive repair system of FIG. 1 according to an exemplary embodiment of the present subject matter.

Referring now to FIG. 3, an exemplary laser powder bed fusion system, such as a DMLS or DMLM system 100, will be described according to an exemplary embodiment. Specifically, AM system 100 is described herein as being used to build or repair blades 70. It should be appreciated that blades 70 are only an exemplary component to be built or repaired and are used primarily to facilitate description of the operation of AM machine 100. The present subject matter is not intended to be limited in this regard, but instead AM machine 100 may be used for printing repair segments on any suitable plurality of components.

As illustrated, AM system 100 generally defines a vertical direction V or Z-direction, a lateral direction L or X-direction, and a transverse direction T or Y-direction (see FIG. 1), each of which is mutually perpendicular, such that an orthogonal coordinate system is generally defined. As illustrated, system 100 includes a fixed enclosure or build area 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. Notably, build platform 118 is movable along a build direction 138 relative to build surface 130. More specifically, build direction 138 may correspond to the vertical direction V, such that moving build platform 118 down increases the height of the part being printed and the build chamber 134. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. For example, energy source 120 may be a laser or any other suitable irradiation emission directing device or irradiation device. In this regard, an irradiation or laser source may originate photons or laser beam irradiation which is directed by the irradiation emission directing device or beam steering apparatus.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. According to exemplary embodiments, beam steering apparatus may further include one or more of the following: optical lenses, deflectors, mirrors, beam splitters, telecentric lenses, etc.

It should be appreciated that other types of energy sources 120 may be used which may use an alternative beam steering apparatus 124. For example, an electron beam gun or other electron source may be used to originate a beam of electrons (e.g., an "e-beam"). The e-beam may be directed by any suitable irradiation emission directing device preferably in a vacuum. When the irradiation source is an electron source, the irradiation emission directing device may be, for example, an electronic control unit which may include, for example, deflector coils, focusing coils, or similar elements.

According to still other embodiments, energy source 120 may include one or more of a laser, an electron beam, a plasma arc, an electric arc, etc.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts (e.g., blades 70) being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 3). Subsequently, recoater mechanism 114 may be moved back to a starting position.

Therefore, as explained herein and illustrated in FIG. 3, recoater mechanism 114, recoater actuator 160, supply platform 152, and supply actuator 154 may generally operate to successively deposit layers of additive powder 142 or other additive material to facilitate the print process. As such, these components may collectively be referred to herein as powder dispensing apparatus, system, or assembly. The leveled additive powder 142 may be referred to as a "build layer" 172 (see FIG. 4) and the exposed upper surface thereof may be referred to as build surface 130. When build platform 118 is lowered into build chamber 134 during a build process, build chamber 134 and build platform 118 collectively surround and support a mass of additive powder 142 along with any components (e.g., blades 70) being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component (e.g., blades 70) being built. More specifically, energy beam 122 is emitted from energy source 120 and beam steering apparatus 124 is used to steer the focal point 174 of energy beam 122 over the exposed powder surface in an appropriate pattern (referred to herein as a "toolpath"). A small portion of exposed layer of the additive powder 142 surrounding focal point 174, referred to herein as a "weld pool" or "melt pool" or "heat effected zone" 176 (best seen in FIG. 4) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component (e.g., blades 70) is complete.

Referring again briefly to FIG. 1, tooling assembly 52 is generally configured for receiving one or more components, e.g., shown here as blades 70, and securely mounting such components for a subsequent additive manufacturing process. Specifically, tooling assembly 52 may secure each of the plurality of blades 70 in a desired position and orientation relative to AM machine 100. In this regard, as used herein, the "position" of a blade 70 may refer to the coordinates of a centroid of blade 70 in the X-Y plane. In addition, the "orientation" of a blade 70 may refer to an angular position of blade 70 about the Z-direction. In this regard, according to an exemplary embodiment, the orientation of each blade 70 may be defined according to the angular position of its chord line (not shown). In this regard, for example, two blades 70 are said to have the same "orientation" when their chord lines are parallel to each other.

According to the exemplary embodiment described herein, tooling assembly 52 includes a mounting plate 180 which is configured for receiving blades 70 before being positioned at a known location on build platform 118. However, it should be appreciated that according to alternative embodiments build platform 118 may be used directly as a mounting plate. In this regard, for example, mounting plate 180 may be removed altogether and blades 70 may be positioned, oriented, and secured where desired directly on build platform 118.

In addition, tooling assembly 52 is generally configured for supporting a plurality of blades 70 such that the repair surface 72 of each blade 70 is positioned within a build plane 82. In this manner, a layer of additive powder (e.g., build layer 172) may be deposited over each repair surface 72 at a desired thickness for forming a first layer of repair segments 74 (FIG. 4) on the tip of each blade 70. Notably, however, due to the height of each blade 70 relative to a height of repair segments 74, conventional additive manufacturing processes require a substantial amount of additive powder 142. Specifically, a substantial volume of additive powder 142 must typically be provided into build chamber 134 to form a powder bed that supports the top layer of additive powder or build layer 172.

As explained above, the powder loading process is typically a manual process that takes a significant amount of time and can result in recoating or print errors when pockets or voids collapse within the additive powder 142. In addition, additive manufacturing machine 100, or build platform 118 more specifically, is typically configured for only supporting a specific volume or weight of additive powder 142 during the build process, thus introducing process limitations when powder bed is filled with additive powder 142. Finally, even to the extent some unfused additive powder 142 may be reused during subsequent additive manufacturing processes, such used additive powder 142 must be carefully screened, filtered, or otherwise reconditioned prior to reuse. Aspects of the present subject matter are directed to minimizing the amount of additive powder required for an additive repair process as described herein.

Figure 5:
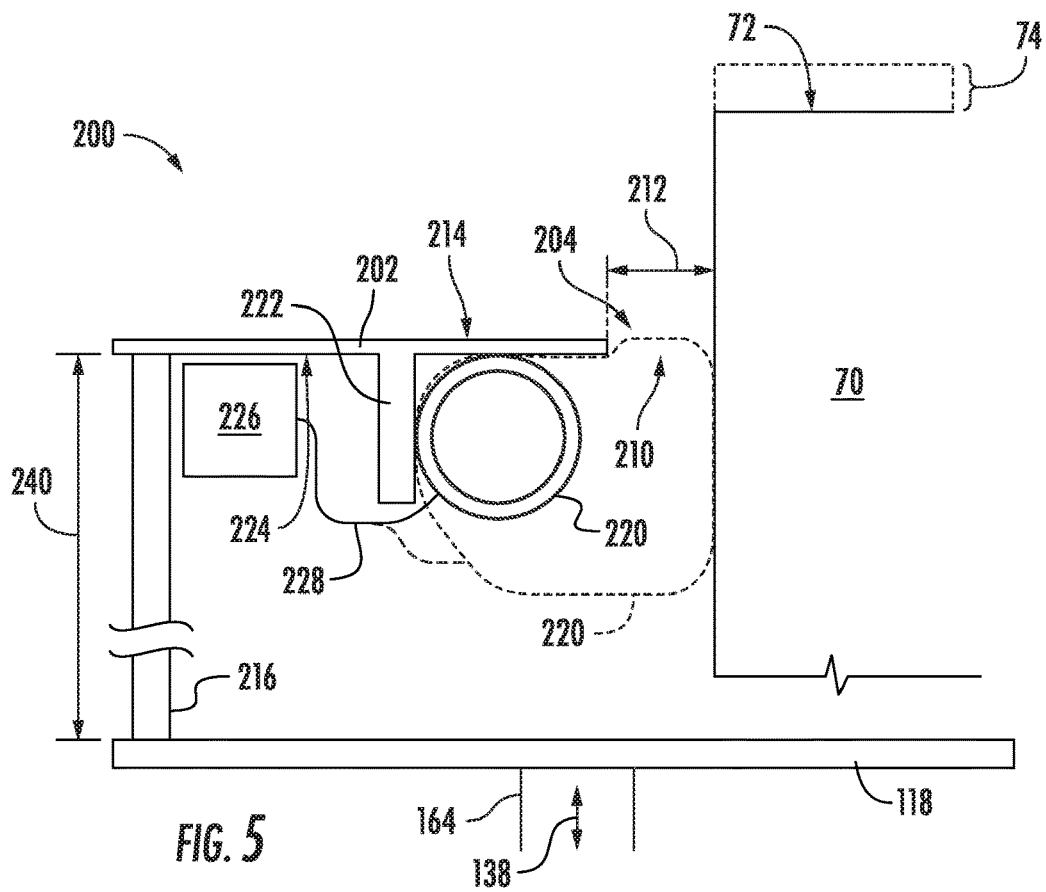
FIG. 5 is a schematic cross sectional view of a powder seal assembly that may be used with the exemplary additive manufacturing machine of FIG. 3 according to an exemplary embodiment of the present subject matter.
Figure 6:
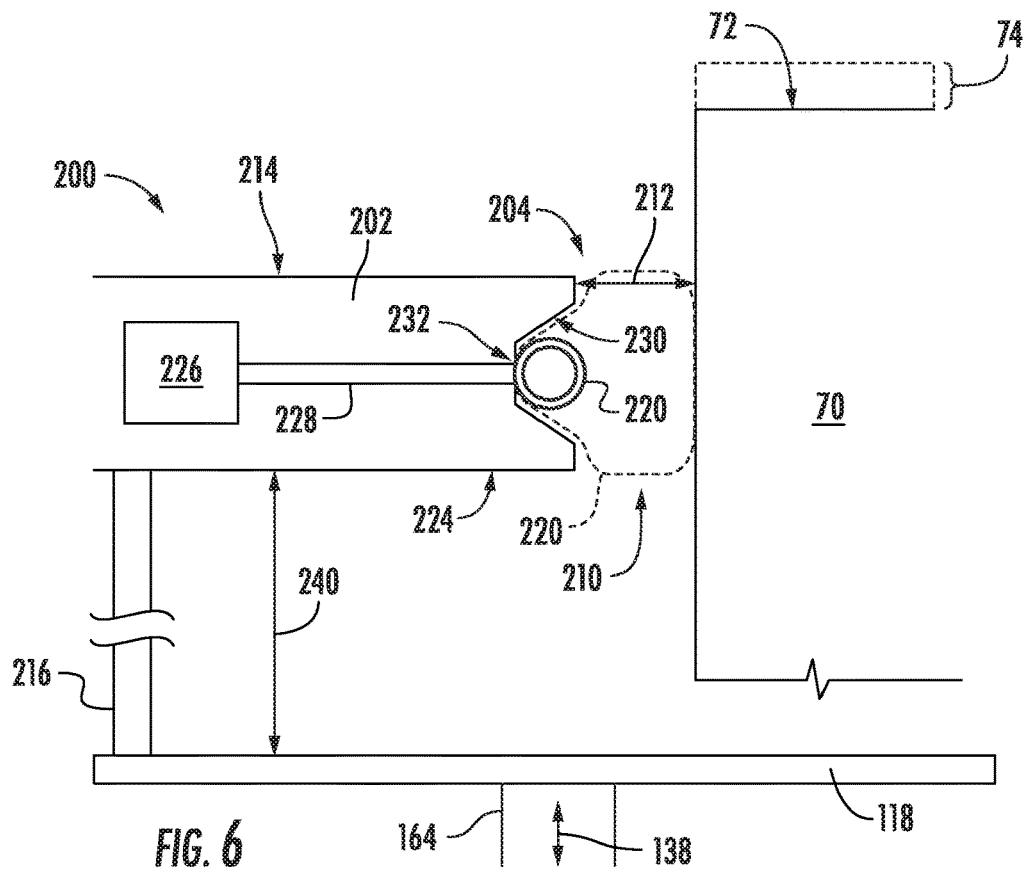
FIG. 6 is a schematic cross sectional view of another powder seal assembly that may be used with the exemplary additive manufacturing machine of FIG. 3 according to an exemplary embodiment of the present subject matter.
Figure 7:
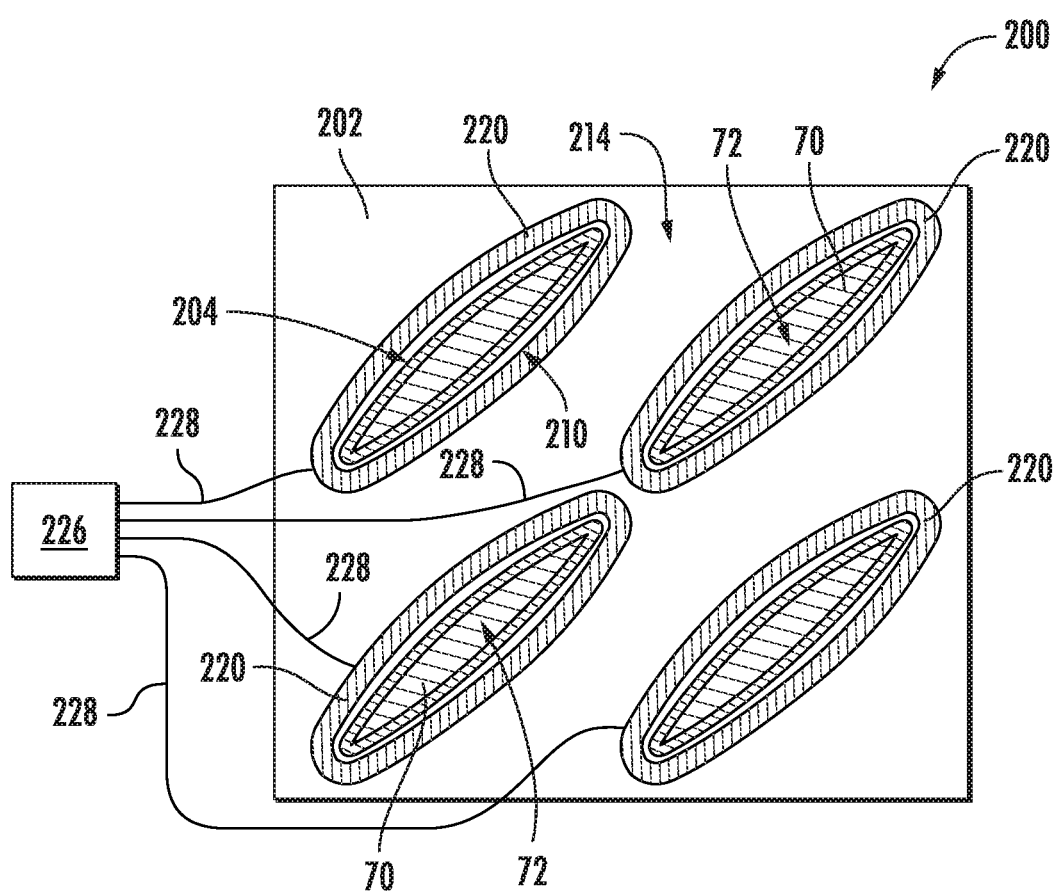
FIG. 7 is a schematic top view of a powder seal assembly that may be used with the exemplary additive manufacturing machine of FIG. 3 in an uninflated or partially inflated position according to an exemplary embodiment of the present subject matter.

Referring now generally to FIGS. 5 through 7, a powder seal assembly 200 that may be used with AM system 100 will be described according to an exemplary embodiment of the present subject matter. For example, powder seal assembly 200 may be a part of tooling assembly 52 as described in relation to FIG. 1. Because powder seal assembly 200 can be used as part of additive repair system 50, tooling assembly 52, or in AM system 100, like reference numerals may be used in FIGS. 5 through 7 to refer to like features described with respect to FIGS. 1 through 4.

As illustrated, powder seal assembly 200 may include a powder support plate 202 that is positioned above build platform 118 and/or mounting plate 180. Powder support plate 202 defines one or more apertures 204 which correspond to the components being repaired, e.g., blades 70. Powder support plate 202 is mountable to mounting plate 180 or over build platform 118 such that each of the components being repaired is positioned within or through one of the apertures 204. Specifically, according to an exemplary embodiment, powder support plate 202 defines twenty (20) apertures 204 which correspond in shape, position, and orientation with blades 70 as mounted to mounting plate 180 or build platform 118. It should be appreciated that according to alternative embodiments, powder support plate 202 may define apertures 204 corresponding to any other suitable component or components to facilitate an additive repair process.

Notably, in order to facilitate mounting of powder support plate 202 prior to a build and the removal of powder support plate 202 after a build, it may be desirable to allow some clearance between powder support plate 202 and blades 70 when powder support plate 202 is mounted to mounting plate 180. In this regard, apertures 204 may be slightly oversized such that blades 70 slide into apertures 204 during a mounting process without contacting powder support plate 202. Moreover, oversized apertures 204 may be desirable to tolerate geometry differences among repair components (e.g., blades 70), especially near the portion where the powder seal may be formed. In this manner, damage to blades 70 and contamination of repair surface 72 may be avoided.

Specifically, powder seal assembly 200 may define a clearance gap 210 between the components (e.g., blades 70) and powder support plate 202 when powder support plate 202 is positioned over mounting plate 180 or build platform 118. According to the illustrated embodiment, clearance gap 210 defines a width 212 which is substantially constant around an entire perimeter of each blade 70. However, it should be appreciated that width 212 need not be uniform, particularly when blades 70 have geometry differences. For example, according to an exemplary embodiment, clearance gap 210 may have a width 212 of approximately 1 mm all the way around the component, e.g., blade 70. According to still other embodiments, clearance gap 210 may be between about 0.1 and 2 millimeters, between about 0.5 and 1.5 millimeters, between about 0.8 and 1.2 millimeters, greater than 2 millimeters, or any other width suitable to facilitate operation of powder seal assembly 200, as described in more detail below.

In order to facilitate the recoating process, top 214 of powder support plate 202 is positioned at or below the build plane 82 when positioned over mounting plate 180 or build platform 118. Specifically, for example, blades 70 may extend above top 214 of powder support plate 202 by approximately half a millimeter, 1 mm, or greater in order to prevent contact with a recoater mechanism 114 or to otherwise facilitate a proper recoating of additive powder or the print process. As illustrated schematically in FIGS. 5 and 6, powder support plate 202 may be mounted to mounting plate 180 or build platform 118 by one or more vertical support legs 216. In this manner, the vertical spacing between build platform 118 and powder support plate 202 is substantially fixed.

Mounting plate 180 and powder support plate 202 may generally be formed from any suitable material and may have any suitable shape. According to the illustrated embodiment, powder support plate 202 may be formed by casting, machining, or by additive manufacturing, e.g., using AM machine 100. In addition, these components are formed from a ceramic or metal material such that they may be reused for multiple repair and rebuild processes. Specifically, once blades 70 have been repaired using a powder bed additive manufacturing process as described below, each blade 70 may be removed from mounting plate 180 and powder support plate 202 may be used to mount and seal different blades 70 in a subsequent repair process. According still other embodiments, powder support plate 202 may be formed from plastic, e.g. via injection molding, or may be formed in any other suitable manner or from any other suitable material.

Referring still to FIGS. 5 through 7, powder seal assembly 200 includes an inflatable sealing element 220 that is operably coupled to powder support plate 202 around apertures 204. Inflatable sealing element 220, like powder support plate 202, is designed such that clearance is provided between inflatable sealing element 220 and blades 70 (when not inflated). For example, the clearance may be greater than or equal to the clearance gap 210 between powder support plate 202 and blades 70. However, inflatable sealing element 220 is configured for inflating to contact and seal against the component, e.g., blades 70, prior to a powder dispensing and recoating process.

As used herein, inflatable sealing element 220 may generally be any device or mechanism suitable for contacting, engaging, and/or sealing against components positioned through apertures 204 defined in powder support plate 202. In this regard, for example, inflatable sealing element 220 may be a bladder that may be selectively filled with a gas or fluid for increasing in size to create a powder-tight seal around the entirety of blades 70. In this manner, powder support plate 202 and inflatable sealing element 220, when inflated, define a powder support surface positioned proximate repair surface 72 of blades 70 such that significantly less additive powder 142 is required to facilitate the printing process.

Notably, it may be desirable to constrain the inflation of inflatable sealing element 220 such that it is urged into contact with the components being repaired, e.g., blades 70. Therefore, powder seal assembly 200 may define one or more constraining members or features which are intended to prevent inflatable sealing element 220 from inflating or extending away from apertures 204. For example, referring to FIG. 5, powder support plate 202 may include or define a constraint wall 222 which extends from powder support plate 202 and against which inflatable sealing element 220 is seated. Specifically, according the illustrated embodiment, constraint wall 222 extends downward along the build direction 138 from a bottom surface 224 of powder support plate 202. Inflatable sealing element 220 is positioned between constraint wall 222 and aperture 204 such that inflatable sealing element 220 is urged toward blades 70 when inflated.

It should be appreciated that constraint wall 222 is only one simple example of features for restraining or directing inflatable sealing element 220 toward blades 70. Variations and modifications may be made while remaining within the scope of the present subject matter. For example, inflatable sealing element 220 is illustrated as being positioned below powder support plate 202. However, according to alternative embodiments, inflatable sealing element 220 may be positioned above or even within powder support plate 202.

As illustrated, inflatable sealing element 220 is operably coupled with a fluid supply source 226 which is generally configured for inflating or deflating inflatable sealing element 220. Specifically, fluid supply source 226 may supply a pressurized gas or fluid through a fluid supply line 228 when aperture 204 needs to be sealed and may depressurize or remove fluid from inflatable sealing element 220 during the mounting or removal of powder support plate 202. It should be appreciated that fluid supply source 226 may include any suitable combination of pumps, valves, regulators, and other devices or mechanisms necessary for supplying or controlling the flow of fluid into and out of inflatable sealing element 220. In addition, according to the illustrated embodiment, fluid supply source 226 is mounted to powder support plate 202. However, according to alternative embodiments, fluid supply source 226 may be mounted remotely from powder support plate 202 at any other suitable location. For example, as shown in FIG. 7, a single fluid supply source 226 selectively provides fluid to a plurality of inflatable sealing elements 220 positioned around a plurality of apertures 204 through a plurality of fluid supply lines 228. Other suitable plumbing configurations and connections are possible and within the scope of the present subject matter.

Referring now specifically to FIG. 6, according to alternative embodiments, powder support plate 202 may define a concave slot 230 which extends around and faces each aperture 204. In other words, a distal end of powder support plate 202 which defines aperture 204 defines concave slot 230. According to exemplary embodiments, inflatable sealing element 220 is positioned within concave slot 230 such that concave slot 230 constrains the growth of inflatable sealing element 220 in a direction away from the component, e.g., blade 70. Specifically, as illustrated, when inflatable sealing element 220 is uninflated, it remains entirely within concave slot 230 such that it may not contact blades 70. However, when inflatable sealing element 220 is inflated, it is directed to make uniform contact with blades 70 thereby forming a powder seal against blades 70.

As shown, inflatable sealing element 220 may be fluidly coupled with fluid supply source 226 by a fluid supply line 228 which passes within or through powder support plate 202. Specifically, powder support plate 202 may define a supply port 232 at the base or the deepest portion of concave slot 230. Supply port 232 may provide fluid communication between fluid supply source 226 and inflatable sealing element 220 for selectively inflating inflatable sealing element 220. Other fluid supply configurations are possible and within the scope of the present subject matter.

Notably, according to exemplary embodiments the present subject matter, powder seal assembly 200 may be mounted such that a vertical gap 240 is defined between the powder support plate 202 and build platform 118 (or mounting plate 180 if used). Specifically, if the components being repaired are high pressure compressor blades for a gas turbine engine, vertical gap 240 may be approximately 1.5 inches (e.g., approximately 38.1 mm), though any other suitable vertical gap 240 may be defined according to alternative embodiments, e.g., depending on the height of components being repaired. For example, vertical gap 240 may be between about 10 and 70 millimeters, between about 20 and 60 millimeters, between about 30 and 50 millimeters, greater than 70 millimeters, etc. Moreover, powder support plate 202 may be directly supported by and move with build platform 118 along build direction 138. In this manner, as repair segments 74 are deposited layer by layer, build platform 118 and powder support plate 202 may move down along build direction 138 to facilitate the depositing and recoating of additive powder for a subsequent layer.

Notably, as illustrated in FIGS. 5 through 7, powder support plate 202 defines a single aperture 204 for receiving a single blade 70. However, it should be appreciated that the schematics shown in these figures are only used for explaining aspects of the present subject matter. According to alternative embodiments, platform 118 may support a plurality of components, e.g., blades 70. In addition powder support plate 202 may define a plurality of apertures 204 that correspond to the blades 70 and inflatable sealing elements 220 that are operably coupled to powder support plate 202 around each of apertures 204. In this manner, fluid supply source 226 may inflate the plurality of inflatable sealing elements 220 simultaneously to form a single powder support surface on top 214 of powder support plate 202 and the plurality of inflatable sealing elements 220.

After powder support plate 202 is positioned over build platform 118 or mounting plate 180 as desired, additive powder 142 may be loaded into powder bed and a recoating assembly, e.g., such as recoater mechanism 114, may spread a layer of additive material (e.g., build layer 172) over top 214 of powder support plate 202 and the repair surfaces 72 of each component being repaired, e.g., blades 70.

Notably, use of the additive manufacturing methods described above along with powder seal assembly 200 facilitates the use of multiple different additive materials, e.g., different compositions of additive powders 142 during a single print process. In this regard, for example, the additive powder 142 used may be a different composition than blades 70 and powder support plate 202. Moreover, each layer of additive material may differ from previously deposited and fused additive layers. In this regard, powder seal assembly 200 may provide for precisely controlled transition locations between the two materials, e.g., between blades 70 and build layer 172. Using the methods described herein, the additive manufacturing process may be performed in multiple steps, in one or more additive manufacturing machines 100 to achieve repair segments 74 that may include a plurality of layers formed from multiple different types of additive powders having different compositions, physical properties, etc.

Notably, powder seal assembly 200 is generally configured for minimizing the volume of the powder bed, e.g., by raising the support surface upon which additive powder 142 is deposited. In addition, powder support plate 202 may move vertically along the build direction 138 with build platform 118. In this manner, the powder bed and blades 70 can grow, layer by layer, as in a conventional additive manufacturing process, without requiring additive powder 142 to fill the entire build chamber 134 along the entire height of the components to be repaired. In this manner, the process for supplying or loading additive powder 142 into powder bed is simplified. For example, an operator need only fill build chamber 134 above powder support plate 202. In this manner, the time required to prepare the additive manufacturing machine 100 for the print process is reduced, as is the amount of additive powder 142 that must be used and the required time for post processing of blades 70 and additive powder 142.

Now that the construction and configuration of additive repair system 50 has been described according to exemplary embodiments of the present subject matter, an exemplary method 300 for mounting a plurality of components for a repair or rebuild process using an additive repair system will be described according to an exemplary embodiment of the present subject matter. Method 300 can be used to repair blades 70 using additive repair system 50, AM machine 100, and powder seal assembly 200, or to repair any other suitable component using any other suitable additive manufacturing machine or system. In this regard, for example, controller 60 may be configured for implementing some or all steps of method 300. Further, it should be appreciated that the exemplary method 300 is discussed herein only to describe exemplary aspects of the present subject matter, and is not intended to be limiting.

Figure 8:
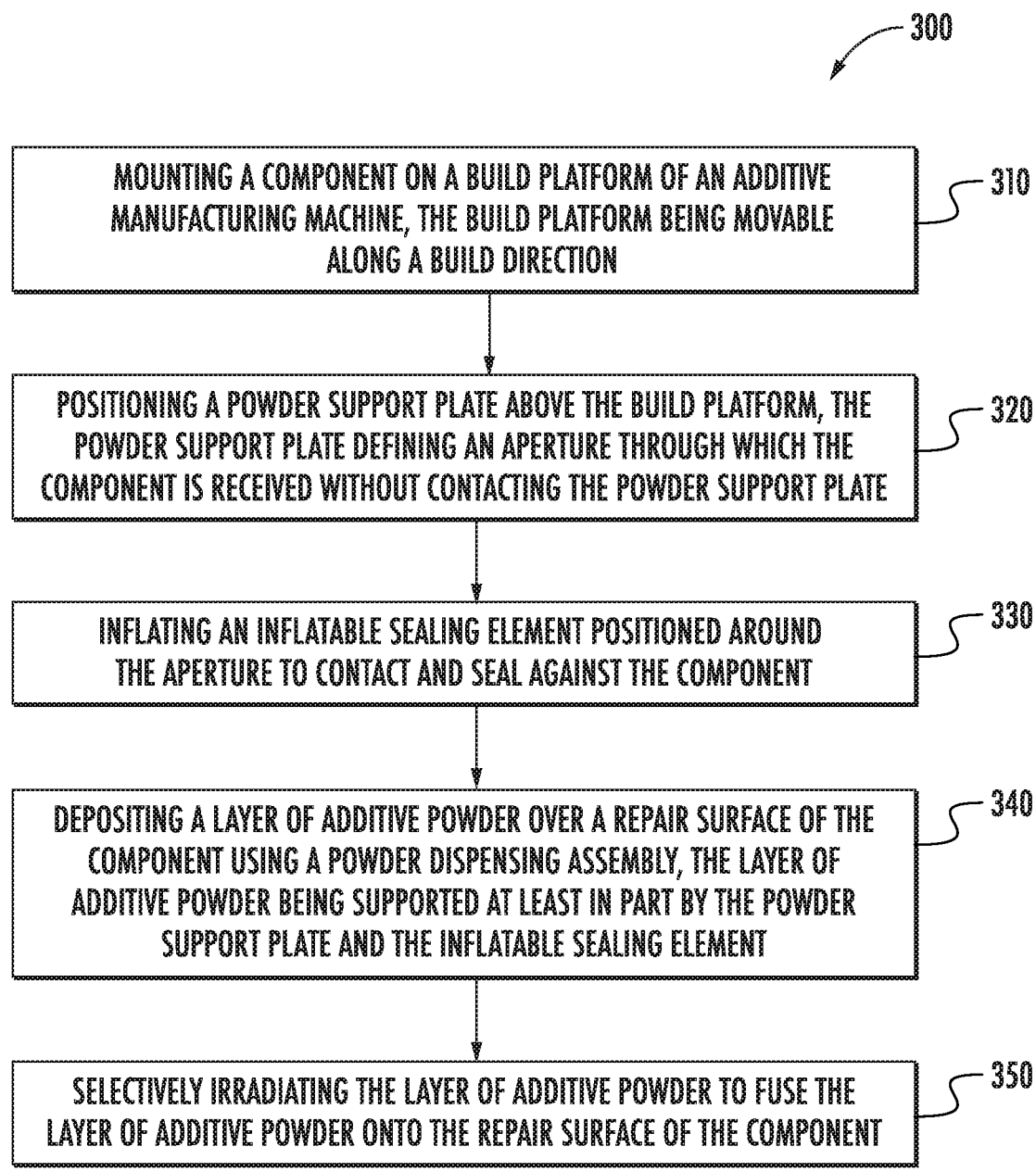
FIG. 8 is a method of mounting a plurality of components in a powder bed additive manufacturing machine according to an exemplary embodiment of the present subject matter.

Referring now to FIG. 8, method 300 includes, at step 310, mounting a component on a build platform of an additive manufacturing machine, wherein the build platform is movable along a build direction. More specifically, according to exemplary embodiments, a plurality of blades 70 may be mounted with the tip or repair surface 72 upward along the vertical direction V. Instead of filling the entire build chamber 134 with additive powder 142 to reach repair surfaces 72 of blades 70, powder seal assembly 200 may be used to create an elevated powder support surface for minimizing powder usage.

Specifically, step 320 includes positioning a powder support plate above the build platform. The powder support plate defines one or more apertures through which the components are received without contacting powder support plate. In this regard, powder support plate 202 defines apertures 204 which correspond to blades 70 in both position and orientation. Step 330 includes inflating an inflatable sealing element positioned around the apertures to contact and seal against the components. In this regard, as described above, inflatable sealing element 220 may be positioned below powder support plate 202 and may be constrained such that is urged toward blades 70 when inflated. Thus, by inflating inflatable sealing elements 220, a powder tight seal is formed between powder seal assembly 200 and each of blades 70.

According to an exemplary embodiment, method 300 may further include additively printing repair segments 74 onto repair surfaces 72 of each blade 70 using AM machine 100. In this regard, step 340 includes depositing a layer of additive powder over the repair surface of the component using a powder dispensing assembly, the layer of additive powder being supported at least in part by the powder support plate and the inflatable sealing element. Step 350 includes selectively irradiating the layer of additive powder to fuse the layer of additive powder onto the repair surface of the component. In this manner, an energy source may fuse additive powder onto each blade tip layer by layer until the component is repaired to an original CAD model or to another suitable geometry.

FIG. 8 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using additive repair system 50, AM machine 100, and powder seal assembly 200 as an example, it should be appreciated that these methods may be applied to repairing or rebuilding any other number, type, and configuration of components using any suitable powder seal assembly or additive manufacturing machine or system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine for repairing a component, the additive manufacturing machine comprising:
a build platform configured for supporting the component and being movable along a build direction;
a powder dispensing assembly for selectively depositing additive powder over the build platform; and
a powder seal assembly comprising:
a powder support plate positioned above the build platform, the powder support plate defining an aperture for receiving the component without contacting the component, the powder support plate further comprising a constraining feature; and
an inflatable sealing element operably coupled to the powder support plate around the aperture, the inflatable sealing element being configured for inflating to contact and seal against the component, wherein the constraining feature prevents the inflatable sealing element from extending away from the aperture.

2. The additive manufacturing machine of claim 1, wherein the constraining feature comprises a constraint wall that prevents the inflatable sealing element from extending away from the aperture.

3. The additive manufacturing machine of claim 1, wherein the constraining feature comprises a concave slot around each aperture, wherein the inflatable sealing element is positioned within the concave slot such that the concave slot constrains the growth of the inflatable sealing element in a direction away from the component.

4. The additive manufacturing machine of claim 3, wherein the powder support plate defines a supply port within the concave slot, the supply port providing fluid communication between a fluid supply source and the inflatable sealing element for selectively providing a fluid into the inflatable sealing element.

5. The additive manufacturing machine of claim 1, wherein the inflatable sealing element is positioned below the powder support plate.

6. The additive manufacturing machine of claim 1, wherein a clearance gap is defined between the powder support plate and the component around the entire component.

7. The additive manufacturing machine of claim 6, wherein the clearance gap is between about 0.5 and 1.5 millimeters.

8. The additive manufacturing machine of claim 1, wherein a vertical gap is defined between the build platform and the powder support plate.

9. The additive manufacturing machine of claim 8, wherein the vertical gap is between about 30 and 50 millimeters.

10. The additive manufacturing machine of claim 1, wherein the powder seal assembly is supported by the build platform such that the powder seal assembly moves along with the build platform along the build direction.

11. The additive manufacturing machine of claim 1, wherein the build platform supports a plurality of components, the powder support plate defines a plurality of apertures corresponding to the plurality of components, and the inflatable sealing element is operably coupled to the powder support plate around each of the plurality of apertures.

12. The additive manufacturing machine of claim 1, wherein the component is an airfoil of a gas turbine engine.

13. The additive manufacturing machine of claim 12, wherein the airfoil is a high pressure compressor blade.

14. A method of mounting a component in an additive manufacturing machine, the method comprising:
mounting the component on a build platform, the build platform being movable along a build direction;
positioning a powder support plate above the build platform, the powder support plate defining an aperture through which the component is received without contacting the powder support plate, the powder support plate further comprising a constraining feature; and
inflating an inflatable sealing element positioned around the aperture to contact and seal against the component, wherein the constraining feature prevents the inflatable sealing element from extending away from the aperture.

15. The method of claim 14, further comprising:
depositing a layer of additive powder over a repair surface of the component using a powder dispensing assembly, the layer of additive powder being supported at least in part by the powder support plate and the inflatable sealing element; and
selectively irradiating the layer of additive powder to fuse the layer of additive powder onto the repair surface of the component.

16. The method of claim 14, wherein the constraining feature comprises a constraint wall that prevents the inflatable sealing element from extending away from the aperture.

17. The method of claim 14, wherein the constraining feature comprises a concave slot around each aperture, the method comprising:
positioning the inflatable sealing element within the concave slot such that the concave slot constrains the growth of the inflatable sealing element in a direction away from the component; and
inflating the inflatable sealing element through a supply port within the concave slot, the supply port providing fluid communication between a fluid supply source and the inflatable sealing element.

18. The method of claim 14, wherein a clearance gap is defined between the powder support plate and the component around the entire component.

19. The method of claim 14, wherein the build platform supports a plurality of components, the powder support plate defines a plurality of apertures corresponding to the plurality of components, and the inflatable sealing element is operably coupled to the powder support plate around each of the plurality of apertures.

20. A powder seal assembly for use in an additive manufacturing machine for repairing a component, the powder seal assembly comprising:
a powder support plate positioned above a build platform of the additive manufacturing machine, the powder support plate defining an aperture for receiving the component without contacting the component, the powder support plate further comprising a constraint wall; and
an inflatable sealing element operably coupled to the powder support plate around the aperture, the inflatable sealing element being configured for inflating to contact and seal against the component, wherein the constraint wall prevents the inflatable sealing element from extending away from the aperture.

* * * * *